United States Patent [19]
Shiraishi et al.

[11] Patent Number: 6,039,026
[45] Date of Patent: Mar. 21, 2000

[54] METHOD OF CONTROLLING INTERNAL COMBUSTION ENGINE

[75] Inventors: Takuya Shiraishi; Toshiharu Nogi; Minoru Ohsuga, all of Hitachinaka; Yoko Nakayama; Noboru Tokuyasu, both of Hitachi, all of Japan

[73] Assignee: Hitachi, Ltd., Tokyo, Japan

[21] Appl. No.: 09/174,151

[22] Filed: Oct. 19, 1998

[30] Foreign Application Priority Data

Oct. 17, 1997 [JP] Japan ..................................... 9-284853

[51] Int. Cl.[7] .............................. F02D 9/00; F02D 13/00
[52] U.S. Cl. ........................................... 123/399; 123/345
[58] Field of Search ............................. 123/90.15, 90.16, 123/90.17, 399, 345

[56] References Cited

U.S. PATENT DOCUMENTS

| | | | |
|---|---|---|---|
| 5,209,193 | 5/1993 | Uchida et al. | 123/90.17 |
| 5,230,320 | 7/1993 | Hitomi et al. | 123/90.15 |
| 5,553,573 | 9/1996 | Hara et al. | 123/90.15 |
| 5,724,927 | 3/1998 | Suzuki | 123/90.15 |
| 5,787,848 | 8/1998 | Stefanopoulou et al. | 123/90.15 |
| 5,809,953 | 9/1998 | Saito et al. | 123/90.16 |
| 5,845,613 | 12/1998 | Yoshikawa | 123/90.15 |

FOREIGN PATENT DOCUMENTS 2-123244   5/1990   Japan .
6-108858   4/1994   Japan .

*Primary Examiner*—Thomas N. Moulis
*Assistant Examiner*—Mahmoud M. Gimie
*Attorney, Agent, or Firm*—Evenson, McKeown, Edwards & Lenahan, P.L.L.C.

[57] ABSTRACT

A method of controlling an internal combustion engine includes mechanism including an intake valve and an exhaust valve provided respectively to an intake port and an exhaust port of a cylinder of the internal combustion engine, a valve mechanism control means for controlling said valve mechanism, an operation condition detection for detecting an operation condition of the internal combustion engine, and a throttle valve for controlling an intake amount in response to an operation amount of an acceleration pedal. When the method of the internal combustion engine, wherein when the operation condition detector judges as a low load or a middle load of the operation condition of the internal combustion engine, the throttle valve is controlled to a high opening degree condition regardless of the operation amount of the acceleration pedal, and by controlling a valve closing timing and/or a valve lift amount of the intake valve, the intake amount is controlled. A pumping loss during a low and a middle load conditions can be reduced widely, a fuel consumption can be improved and further during a high load condition knocking can be prevented.

15 Claims, 11 Drawing Sheets

METHOD OF CONTROLLING INTERNAL COMBUSTION ENGINE

BACKGROUND OF THE INVENTION

This application claims the priority of Japanese application No. 9-284853, filed Oct. 17, 1997, the disclosure of which is expressly incorporated by reference herein.

The present invention relates to an apparatus and a method of controlling an internal combustion engine, wherein a valve opening timing and a valve closing timing of an intake valve, and an exhaust valve of the internal combustion engine are controlled in accordance with an operation condition of the internal combustion engine.

As conventional methods of controlling a load of an internal combustion engine, one of them is a method for supplying a fuel amount suited to an air amount by controlling an intake amount according to a load and another of them is a method for controlling a fuel amount according to a load without a limitation of an intake amount. The above stated differences result from the property of the fuel to be used, namely the former method corresponds to a gasoline internal combustion engine and the latter method corresponds to a diesel internal combustion engine.

In general, the reason why the diesel engine has a good fuel consumption is that the intake amount is not squeezed and a pumping loss is not generated. On the other hand, in the gasoline engine because a load control is performed according to the intake amount, during a low load condition since it is necessary to squeeze the air amount, a throttle valve is provided on a midway of an intake air passage.

Accordingly, a pressure in an intake port which is provided a downstream of the throttle valve has a pressure lower than atmospheric pressure and has a negative pressure. Since a pressure in a combustion chamber at the end of an exhaust process has roughly atmospheric pressure, at the start of an intake process it presents negative pressure upstream of an intake valve (a side of the intake port) but it presents atmospheric pressure at the downstream (a side of the combustion chamber).

With the above stated reasons, so as to flow the air from the intake port side to the combustion chamber side, it is necessary to intake the air in accordance with a descent movement of a piston, then the engine requires the role of a working for taking in the air. This working is a negative working against the engine, accordingly it is called a pumping loss. In particular, during a low load condition and a middle load condition, since an opening degree of the throttle valve is small and the pumping loss is always generated, accordingly a bad fuel consumption condition results.

As a technique for reducing the pumping loss, a lean burn system has been proposed, in which to the same fuel amount by increasing the air amount the combustion is performed, and this lean burn system has been put to practical use. However, in this lean burn system, the air amount is controlled in accordance with the throttle valve and the pumping loss is generated at a considerable operation area.

To reduce the generation of the pumping loss to a minimum, it has been proposed that the air amount must be controlled at a vicinity of the combustion chamber and such a control must be carried out by the intake valve. By controlling a valve opening period and a valve lift amount of the intake valve the air amount can be. A minute control of the air amount necessary for an idling time is, however, adversely affected largely with regard to the accuracy for the valve opening period control and the valve lift amount control of the intake valve.

SUMMARY OF THE INVENTION

From the above stated circumstances, an object of the present invention is to provide, in an internal combustion engine for controlling an intake amount according to a control of an intake valve, a method of controlling an internal combustion engine wherein a pumping loss can be reduced over the entire operation range and further fuel consumption can be improved.

To attain the above stated object, according to the present invention, when an operation condition of the internal combustion engine is judged as a low load or a middle load, regardless of an operation amount of an acceleration pedal, a throttle valve is controlled to a high opening degree condition and also a valve closing timing or a valve lift amount of the intake valve is controlled and as a result the intake amount is controlled.

BRIEF DESCRIPTION OF DRAWINGS

These and further objects, features and advantages of the present invention will become more apparent from the following detailed description of a currently preferred embodiments when taken in conjunction with the accompanying drawings wherein.

DETAILED DESCRIPTION OF THE DRAWINGS

Figure 1:
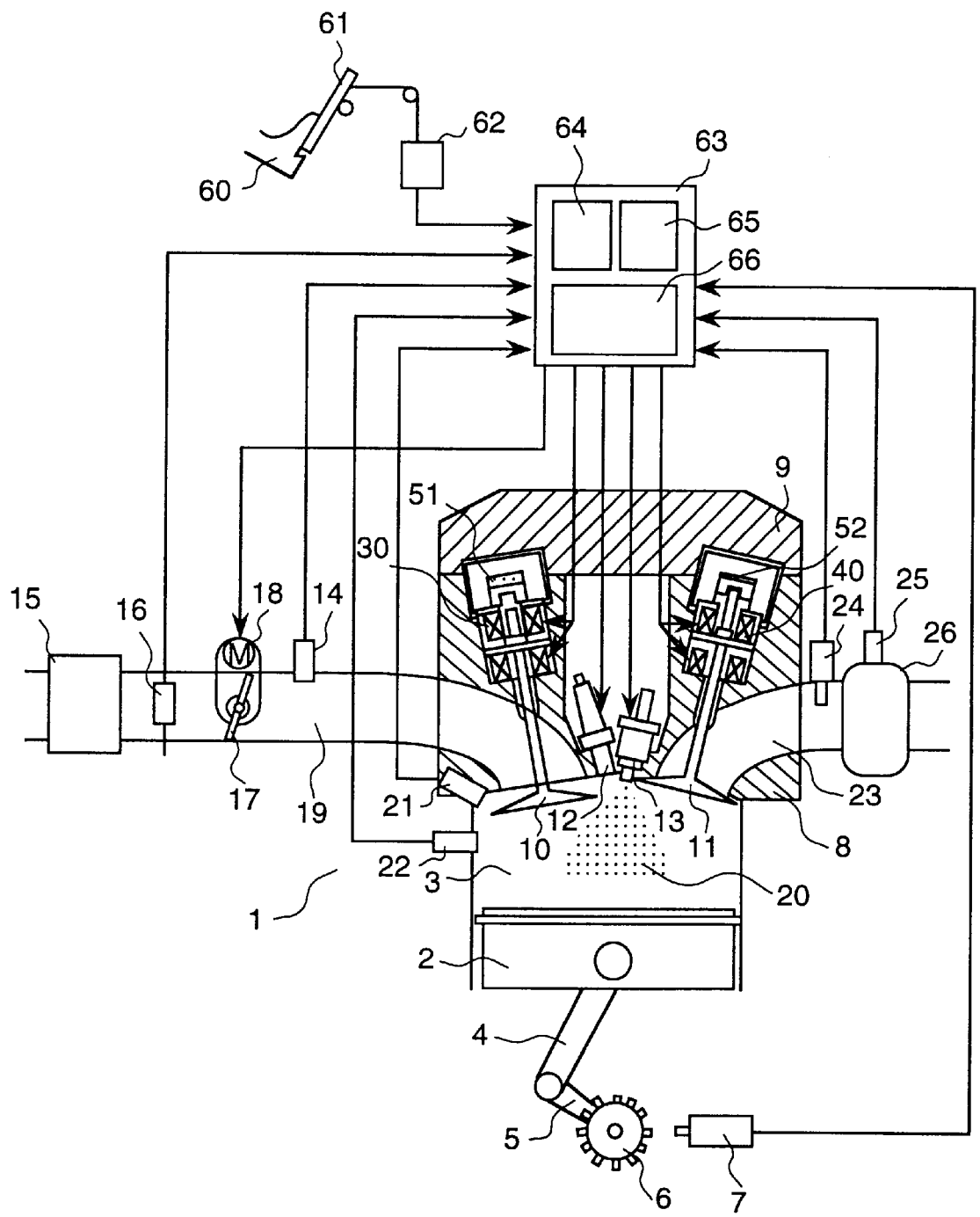
FIG. 1 is a schematic view showing a system in which the present invention is employed.

As shown in FIG. 1, an internal combustion engine 1 comprises a crank mechanism having a connecting rod 4 and a crank shaft 5, and a combustion chamber 3 which is formed by a piston 2 connected to this crank mechanism and an engine head 8 of the engine 1. The combustion chamber 3 is sealed up closely by an intake valve 10, an exhaust valve 11 and an ignition plug 12, which are mounted on the engine head 8. Each of the intake valve 10 and the exhaust valve 11 is operated by variable valve mechanisms 30 and 40, respectively. The engine 1 intakes the air necessary for carrying out the combustion to the combustion chamber 3 according to an operation of a throttle valve 17 and a reciprocating operation of the piston 2.

As to the air taken in to the engine 1, dusts and dirt included in the air are removed through an air cleaner 15, and using an air amount sensor 16 an intake amount which is a basis of the calculation for a fuel injection amount is measured. When an opening degree of the throttle valve 17 is small, and an intake port 19 downstream of the throttle valve 17 and an interior portion of the combustion chamber 3 become a negative pressure lower than an atmospheric pressure, a pressure sensor 14 in the intake air passage measures always a pressure in the interior portion of the intake air passage and such a pressure is reflected to carry out a control of the engine 1.

A control unit 63 for controlling the engine 1 comprises an operation condition detector 66 for detecting the engine 1 under a basis of the signals of the various sensors, and a variable valve controller 64 for controlling the variable valve mechanisms 30, 40 mounted on the engine 1. The control unit 63 controls a fuel amount and an injection timing of the fuel injected from a fuel injector 13.

An operation amount of an acceleration pedal 61 which is operated by a driver 60 of a vehicle on which the engine 1 is mounted is converted to an electric signal by a potentiometer 62 and is inputted to the operation condition detector 66 in the control unit 63. As the signals being inputted to the operation condition detector 66, there are other signals, for example, which are the signals from crank angle sensors 6, 7 mounted on the crank shaft 5, a signal from a temperature sensor 25 for detecting a temperature of an exhaust gas catalyst, a signal from a pressure sensor 21 installed on the combustion chamber 3 and for detecting a pressure in the interior portion of the combustion chamber 3, and a signal from a knock sensor 22 for detecting the knocking.

The variable valve controller 64 outputs the control signals to a motor 18 for operating the throttle valve 17 under a basis of the signal from the operation condition detector 66 and the variable valve mechanism 30 for operating the intake valve 10, thereby the variable valve controller 64 adjusts the air amount which is taken in to the engine 1. The control unit 63 outputs the control signal to the fuel injector 13 under a basis of the signal from the operation condition detector 66 and further control unit 63 adjusts the fuel injection amount and the injection period.

Figure 2:
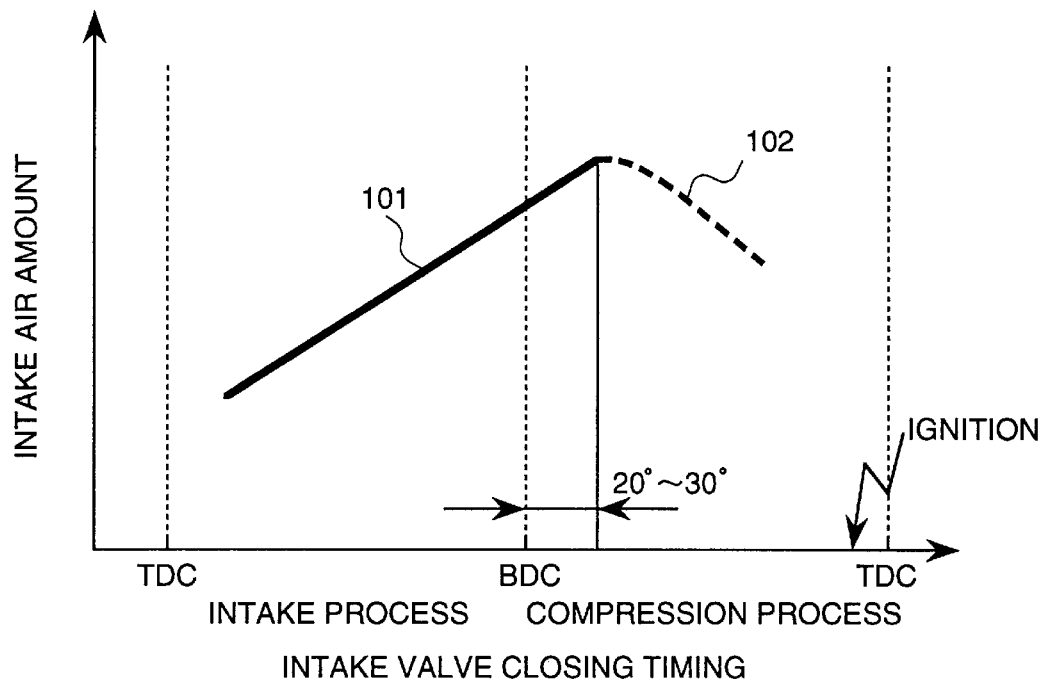
FIG. 2 is a graph showing the relationship between a valve closing timing of an intake valve and an intake amount.

First of all, the relationship between the valve closing timing of the intake valve 10 and the intake amount which resides an essential point of the present invention will be explained now referring to FIG. 2. In FIG. 2, the horizontal axis represents the valve closing timing of the intake valve 10 and the valve closing timing is fixed to a predetermined constant value which is a value of a vicinity of TDC (top dead center) and the vertical axis respects an intake amount. As shown in this figure, when the valve opening timing of the intake valve 10 is varied from the intake process to the compression process, also the intake amount is varied according to a manner from the solid line 101 to the dotted line 102.

Because the closing of the intake valve 10 during the intake process is shutting out the air for flowing into the combustion chamber 3, then the intake amount is reduced. The valve closing time of the intake valve 10 is retarded (approaching to BDC (bottom dead center), as shown in the solid line 101 the intake amount is made to increase. The maximum value of the intake amount is obtained at the valve closing timing in which it has passed a little past BDC (with the crank angle of 20–30 degrees). This is a phenomenon which is called as an inertia supercharge and to obtain the inertia (a mass) of the intake the air flows into the combustion chamber 3 after it has passed BDC.

After the passing BDC, inasmuch as the compression process exists, after that timing is passed, due to an ascent movement of the piston 2, the air which has been taken in the combustion chamber 3 is put back (flow back to the intake port side), and the intake amount in the combustion chamber 3 decreases as shown in the dotted line 102. Further, the compression until the ignition timing is insufficient, since the combustion becomes incomplete and the valve closing timing of the intake valve 10 is retarded, as a result of which the above stated phenomenon is not preferable.

Figure 3:
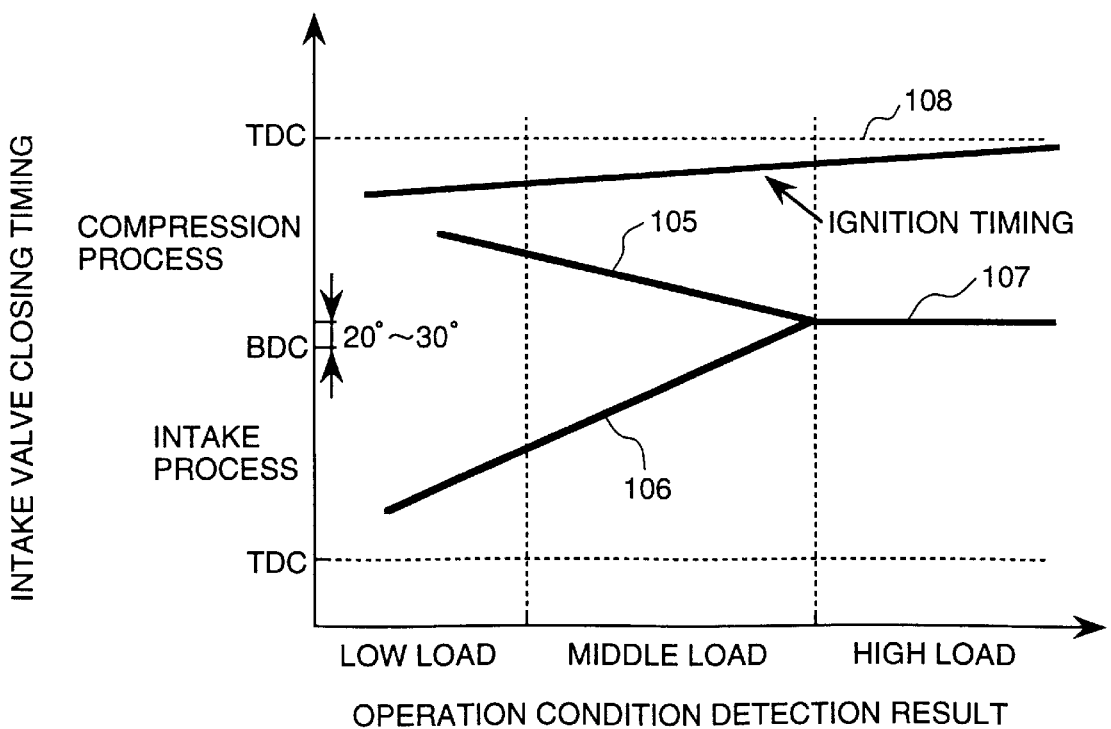
FIG. 3 is a graph showing an operation condition detection result and a valve closing timing of the intake valve.

Next, the valve closing timing determination method in a case where the operation condition detector 66 judges the condition of the engine 1 at the low load, the middle load and the high load will be explained referring to FIG. 3. As stated later on (FIG. 9), the throttle valve 17 is used to control only the air amount during an extreme low load condition such as the idling etc. and during the high load condition, but at the low load condition and the middle load condition it is in a full opening condition.

The air amount for flowing into the combustion chamber 3 is controlled in accordance with the valve opening period of the intake valve 10. In a case where the valve opening timing is made constant, the air amount is controlled in accordance with the valve closing timing of the intake valve 10. As a result, the valve closing timing of the intake valve 10 is determined as shown in FIG. 3, in the case of the low load condition and the middle load condition as shown in the solid line 105 or the solid line 106.

The solid line 106 indicates the case of the earlier closing system where the intake valve 10 is made to carry out the valve closing before BDC of the intake process, and the solid line 105 indicates the later closing system where the intake valve 10 is made to carry out the valve closing after BDC. In the latter closing system, it is necessary to pay attention to the time interval to the ignition timing shown in the dotted line 108.

When the high load condition is judged, as shown in the solid line 107, the valve closing timing of the intake valve 10 is fixed to a predetermined constant value. This predetermined constant value is a timing in which using the inertial of the air the inertia supercharge effect is maximized and in general it is 20–30 degrees after BDC.

Next, a control method where the variable valve mechanism and the direct injection engine are combined will be explained by comparison with a port injection engine.

Figure 4:
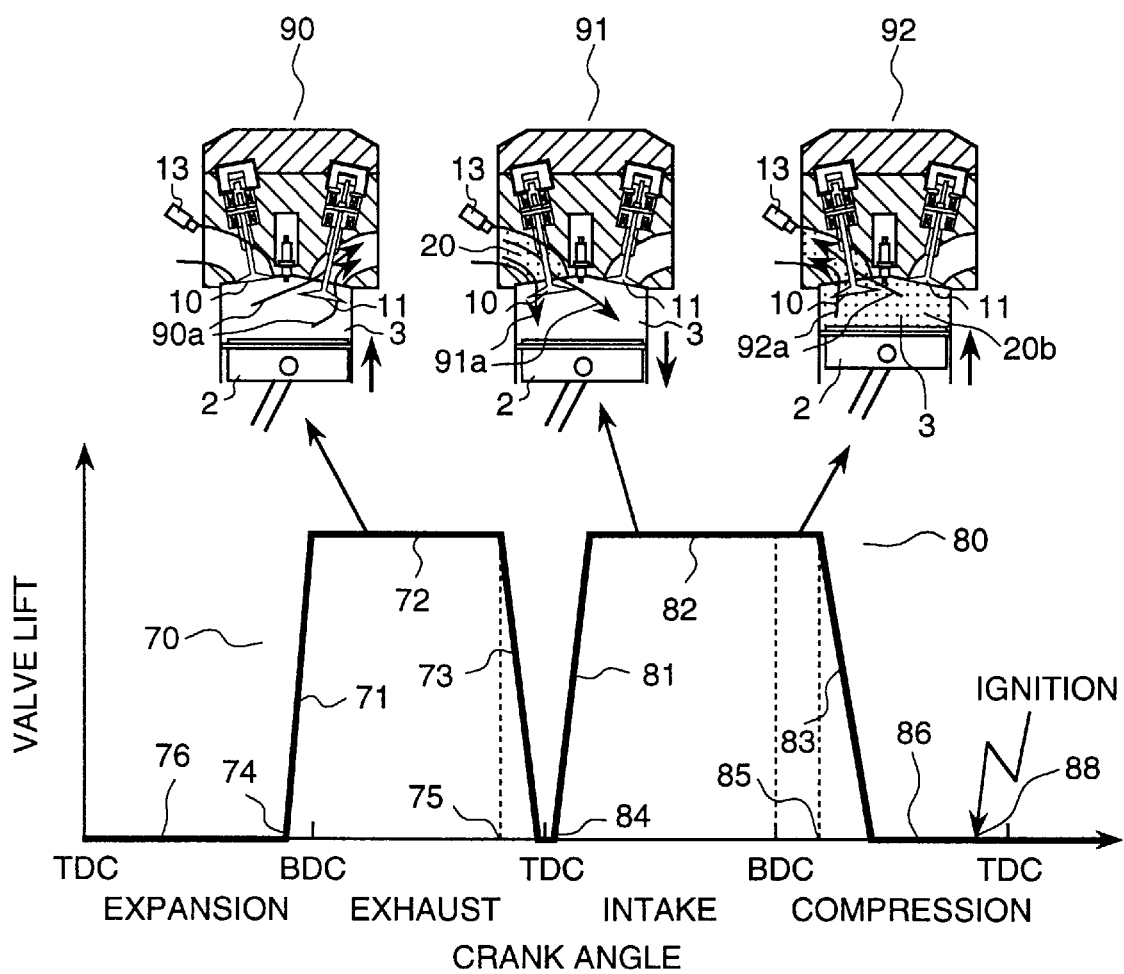
FIG. 4 is a graph showing a condition of an intake port injection engine in which a later closing system in which the present invention is employed.

FIG. 4 schematically shows the valve closing operation and the valve closing operation of the intake valve 10 and the exhaust valve 11, and a condition of the engine 1 during the times where the variable valve mechanism is combined with the port injection engine. A valve lift amount against to the crank angle which is outputted from the crank angle sensors 6, 7 which are mounted on the engine 1 shown in FIG. 1 is indicated.

A rectangular shape wave 70 shows a change in the valve lift amount of the exhaust valve 11 and further a rectangular shape wave 80 shows a change in the valve lift amount of the intake valve 10. At the crank angle shown by reference numeral 74, the exhaust valve 11 starts the valve opening operation shown by reference numeral 71 and reaches immediately a predetermined value shown by reference numeral 72 at a vicinity of the maximum valve lift amount (including the maximum valve lift amount) and during a predetermined period such a valve lift amount is continuously maintained.

At this time, the engine 1 presents a condition shown by reference numeral 90 and only the exhaust valve 11 is opened, the exhaust gas in the combustion chamber 3 is discharged as shown by arrow 90a according to the ascent movement of the piston 2. At the crank angle shown by reference numeral 75, the exhaust valve 11 starts the valve closing operation shown by reference numeral 73 and the valve closing is completed before TDC.

Next, at the crank angle shown by reference numeral 84 after TDC, the intake valve 10 starts the valve opening operation shown by reference numeral 81 and immediately reaches a predetermined value shown by reference numeral 82 at a vicinity of the maximum valve lift amount (including the maximum valve lift amount) and during a predetermined period such a valve lift amount is continuously maintained.

At this time, the engine 1 present a condition shown by reference numeral 91 and the exhaust valve 11 is carried out the valve closing and only the intake valve 10 presents the valve opening, and the air flows into the combustion chamber 3 as shown by arrow 91a according to a descent movement of the piston 2. Then the fuel injection spray 20 is injected by the fuel injector 13.

During this intake process, the fuel injection spray 20 is mixed fully with the air, and a homogenous mixture is formed. After the intake passes BDC, the piston 2 starts the ascent movement and the engine 1 presents a condition shown by reference numeral 92. At this time, the intake valve 10 still carries out valve opening, and a part of a mixture 20b in the combustion chamber 3 is flowed back to the intake port direction as shown by arrow 92a.

After BDC, the crank angle shown by reference numeral 85 exists, and the intake valve 10 starts the valve closing operation shown by a reference numeral 83 and carries out the valve closing. At the crank angle shown by reference numeral 86 after the intake valve 10 carries out the valve closing, when the engine 1 rotates one rotation a position of the crank angle shown by reference numeral 76 is brought about, and a similar operation is repeated.

Accordingly, in the period from BDC to the valve closing, the mixture 20b is flowed back, the mixture 20b (namely, the fuel) remaining in the combustion chamber 3 is decreased and the engine output is lowered. Further, since the mixture flowed back in the intake port is taken in the combustion chamber 3 at a next cycle, a discrepancy of the air-fuel ratio is caused. As a result, it is not preferable to employ the control method of the variable valve mechanism according to the present invention to the intake port engine.

Figure 5:
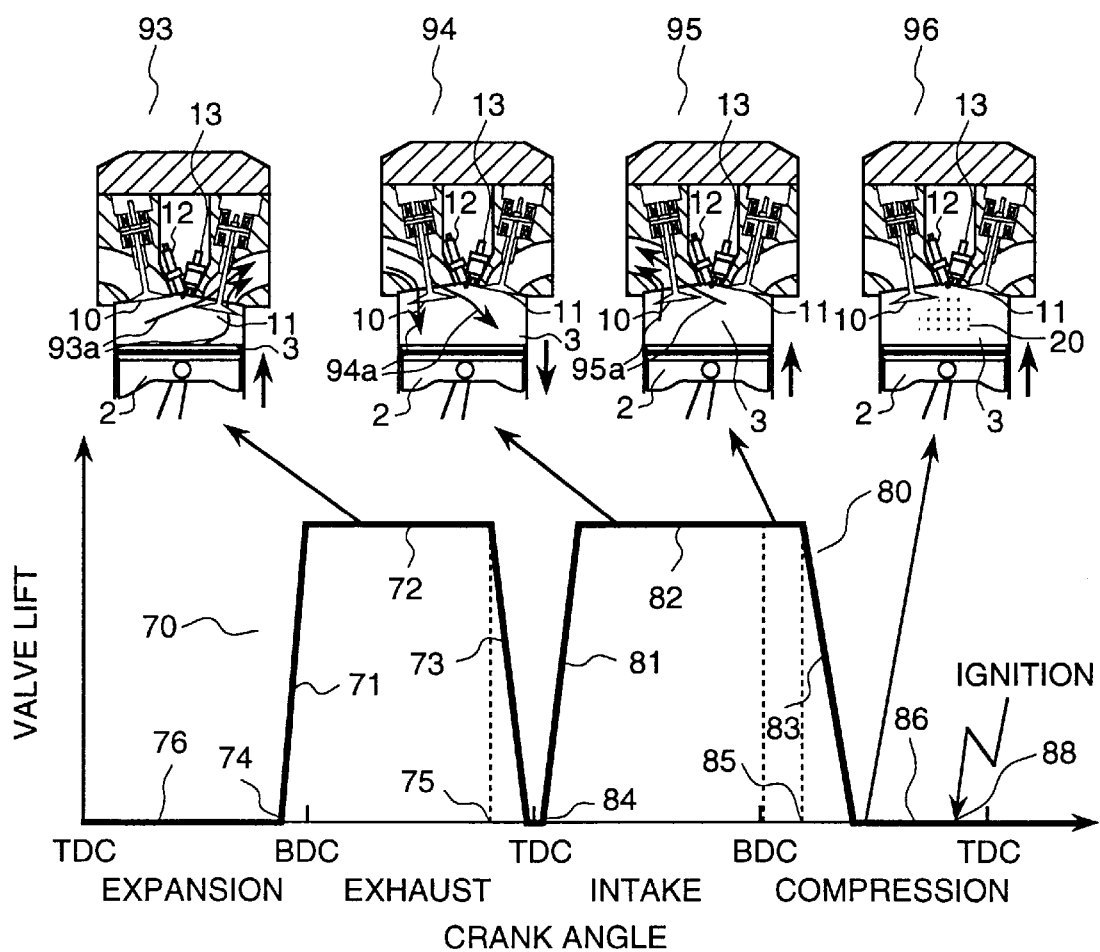
FIG. 5 is a graph showing a condition of a direct injection engine in which a later closing system in which the present invention is employed.

Next, referring to FIG. 5, the variable valve mechanism is combined with the direct injection engine. It will be explained that the operation of the intake valve 10 and the operation of the exhaust valve 11 are the same as shown in FIG. 4.

The period where the exhaust valve 11 carries out the valve opening, the engine 1 presents a condition shown by reference numeral 93 and the exhaust gas is discharged as shown by arrow 93a. Then the exhaust valve 11 is closed and the intake valve 10 is opened, accordingly the engine 1 presents a condition shown by reference numeral 94.

According to the descent movement of the piston 2, only air is taken in as shown by arrow 94a. After BDC of the intake process, the engine 1 is in a condition shown by reference numeral 95 and the intake valve 10 carries out the valve opening, because the piston 2 carries out the ascent movement, the air in the combustion chamber 3 is flowed back as shown by arrow 95a. At this time, only the air is flowed back.

At the crank angle shown by reference numeral 85 after BDC, the intake valve 10 starts the valve closing operation shown by reference numeral 83 and carries out the valve closing. The intake valve 10 presents the valve closing and after the combustion chamber 3 is closely sealed, the fuel 20 is injected and the flow back of the fuel 20 can be prevented.

The essential point according to the present invention resides in that, after the valve closing operation of the intake valve 10, the fuel 20 is injected, and this is a reason for combining the direct injection engine. The setting of the above stated injection timing is limited to the period during the low load and the low revolution time, because the time until the spark ignition shown by reference numeral 88 is shortened, as a result of which the evaporation time of the fuel 20 is not insufficient.

On and after the crank angle shown by reference 86 after the valve closing of the intake valve 10, when the engine 1 carries out one rotation and the crank angle is again in the position shown by reference numeral 76 and a similar operation is repeated.

Figure 6:
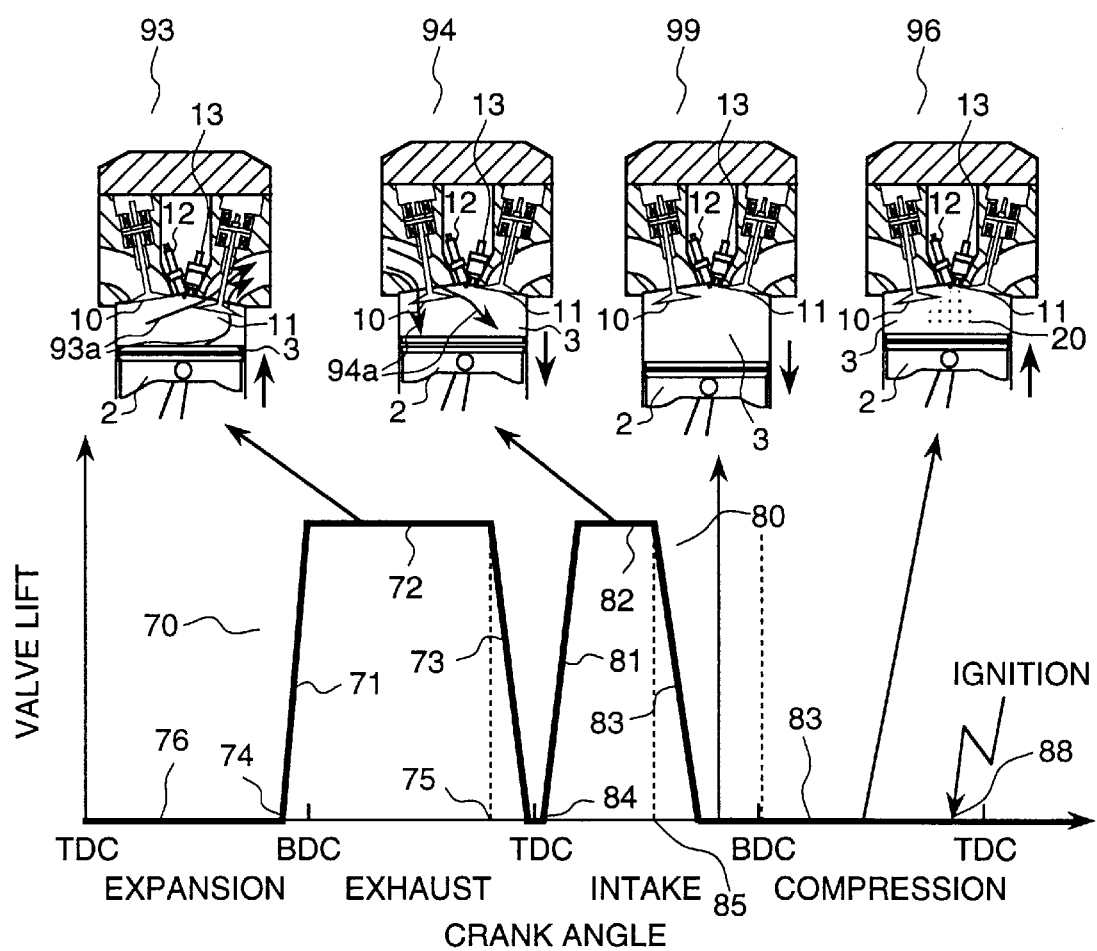
FIG. 6 is a graph showing a condition of a direct injection engine in which an earlier closing system in which the present invention is employed.

FIG. 6 shows a method for performing the earlier valve closing (the earlier closing system) so that the intake valve 10 does not generate the flow back. At the crank angle shown by reference numeral 84 after the exhaust process is finished, the intake valve 10 starts the valve opening operation shown by reference numeral 81 and immediately it reaches a predetermined value shown by reference numeral 82 at a vicinity of the maximum valve lift amount (including the maximum valve lift amount), and a predetermined period the above stated valve lift amount is continuously maintained.

At this time, the engine 1 presents a condition 94 and the exhaust valve 11 carries out the valve closing. Only the intake valve 10 carries out the valve opening and according to the descent movement of the piston 2, accordingly the air flows into the combustion chamber 3 as shown by arrow 94a.

At the midway point of the intake process, with the crank angle shown by reference numeral 85, the intake valve 10 starts the valve closing operation shown by reference numeral 83, the intake valve 10 carries out the valve closing considerably before BDC, the inflow of the air is shut out and then the intake amount decreases.

The engine 1 after the valve closing presents a condition shown by reference numeral 99, the combustion chamber 3 is closely shut out by the intake valve 10 and the exhaust valve 11, and the piston 2 carries out the descent movement. After BDC the compression process is carried out and, according to the ascent movement of the piston 2, the air in the combustion chamber 3 is compressed.

In this earlier valve closing system, since the flow back phenomenon does not occur, the injection timing of the fuel 20 can be carried out during the intake process and also during the compression process, and the lean burn operation by an optimum injection timing can be carried out.

Figure 7:
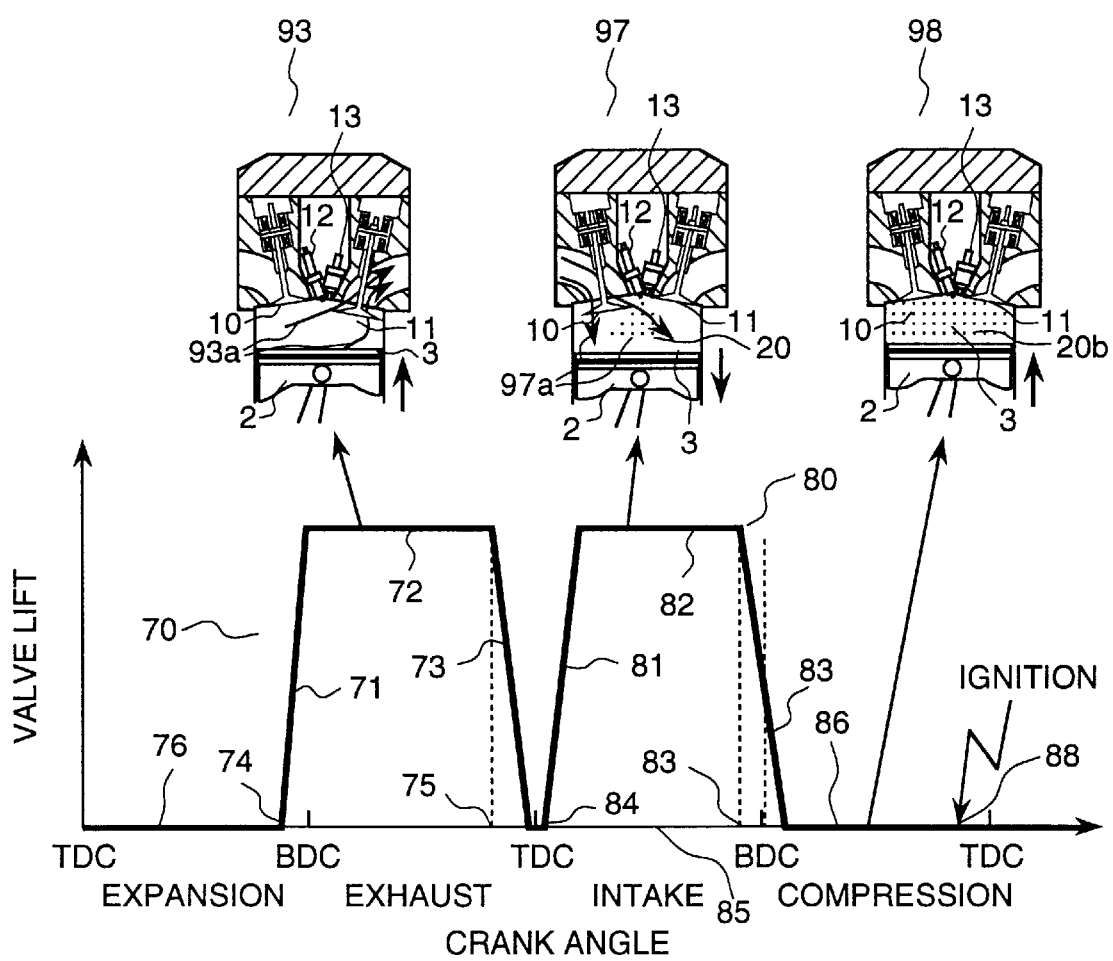
FIG. 7 is a graph showing a condition of a high load operation of a direct injection engine in which the present invention is employed.

FIG. 7 shows the operations of the intake valve 10 and the exhaust valve 11, and the engine conditions during the high load condition. When the operation condition detector 66 judges the condition of the engine 1 as the high load condition, the intake valve 10, as shown in FIG. 2, taking the inertia supercharge effect under consideration, the valve closing timing is controlled to maximize the intake amount.

At the crank angle shown by reference numeral 84 after the exhaust process is finished, the intake valve 10 starts the valve opening operation shown by reference numeral 81 and immediately it reaches to a predetermined value shown by reference numeral 82 at a vicinity of the maximum valve lift amount (including the maximum valve lift amount) and for a predetermined period the above stated valve lift amount is continuously maintained.

At this time, the engine 1 presents a condition shown by reference numeral 97 and the exhaust valve 11 carries out the valve closing. Only the intake valve 10 carries out the valve opening, and according to the descent movement of the piston 2, the air flows into the combustion chamber 3 as shown by arrow 97a and then fuel injector 13 injects the fuel 20. During this intake process, the fuel spray 20 and the air are mixed fully and a homogenous mixture is formed.

During the high load condition, to intake a greater air amount the intake valve 10 starts the valve closing operation shown by reference numeral 83 at the crank angle shown by reference numeral 85 to carry out the valve closing at a vicinity of 20–30 degrees after BCD. The valve closing timing of the intake valve 10 is determined to take a greater air amount taking the inertia supercharge effect under consideration.

In the condition shown by reference numeral 98 in the combustion chamber 3 after the valve closing of the intake valve 10, a homogenous mixture 20b is formed. As to the operation of the intake valve 10 during the high load condition, to take a greater intake amount the valve closing timing is set in which the flow back is minimized. As a result, the injection timing of the fuel 20 is set before the valve closing timing of the intake valve 10, and the intake and the fuel 20 are mixed fully.

Figure 8:
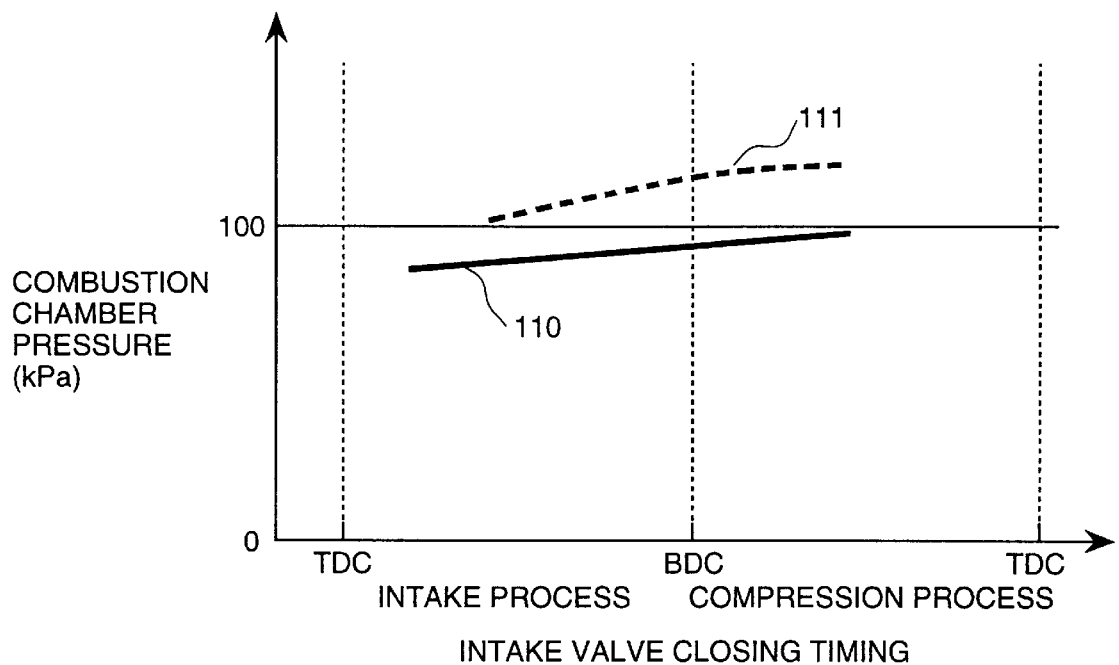
FIG. 8 is a plot showing the relationship between a valve closing of the intake valve and a pressure in a combustion chamber.

Next, the method of judging the operation condition of the engine 1 will be explained. A method of judging from the pressure in the combustion chamber 3 will be explained referring to FIG. 8. The horizontal axis represents the valve closing timing of the intake valve 10 (the valve opening timing is fixed to a predetermined constant value at the vicinity of TDC) and the vertical axis represents the pressure in the combustion chamber 3 when the intake valve 10 carries out the valve closing.

The pressure in the combustion chamber 3 is measured using a sensor 21 which is mounted on the engine 1. When a supercharger is mounted on the engine 1, the intake amount increases in proportion to the supercharge pressure. Accordingly, when the supercharge pressure is arisen more than an atmospheric pressure and the intake amount is increased, the pressure in the combustion chamber 3 where the intake valve 10 presents the valve closing is higher than the atmospheric pressure as shown by the dotted line 111.

The above stated condition is judged as the high load operation condition but in the case of less than the atmospheric pressure the condition is judged as the low load condition and the middle load condition. In a case where a supercharger is not mounted on the engine 1, since the pressure in the combustion chamber 3 is always less than the atmospheric pressure as shown in the solid line 110, it is impossible to adopt the above stated operation condition judgment method.

Figure 9:
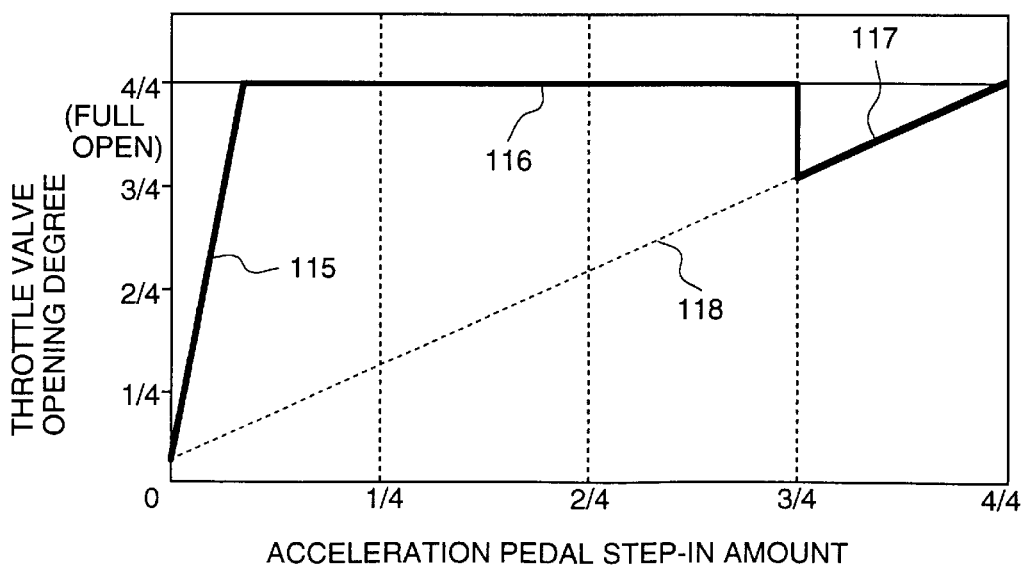
FIG. 9 is a plot showing the relationship between a step-in amount of an acceleration pedal and an opening degree of a throttle valve according to the present invention.

Now, another judgment method for the engine having no supercharger will be explained. FIG. 9 shows a relationship between the step-in amount of the acceleration pedal and the opening degree of the throttle valve. In a condition where the acceleration pedal 61 is not stepped-in, the throttle valve 17 is opened slightly to supply the air amount for idling the engine 1. When the throttle valve 17 and the acceleration pedal 61 are connected through a wire, the throttle valve 17 is controlled corresponding the step-in amount of the acceleration pedal 61 as shown in the dotted line 118.

An essential point according to the present invention resides in that, except for the extremely low load condition and the high load condition, the throttle valve 17 is opened fully, namely as a condition shown in the solid line 116, so that the pumping loss is reduced. During the extremely low load condition, immediately thereafter the throttle valve 17 is controlled by forming a slope so that the intake amount as shown in the solid line 115 is not changed abruptly.

Since the step-in amount of the acceleration pedal 61 forms an index for expressing a requirement torque of the driver 60, when the acceleration pedal 61 stepped-in more than ¾ of the maximum step-in amount, the high load condition is judged, and as shown in the solid line 117, the throttle valve 17 is interlocked to the step-in amount of the acceleration pedal 61.

Until the step-in amount ¾ of the acceleration pedal 61, the intake amount is controlled with the valve closing timing of the intake valve 10; however, more than the step-in amount ¾ of the acceleration pedal 61 will fix the valve closing timing of the intake valve 10 to the timing where the intake amount is taken in at the maximum and by controlling the throttle valve 17, and the intake amount is increased. The operation of the throttle valve 17 is carried out by an electronic controlling motor 18 which is mounted on the engine 1. Accordingly, the operation condition of the engine 1 can be judged according to the step-in amount of the acceleration pedal 61.

Figure 10:
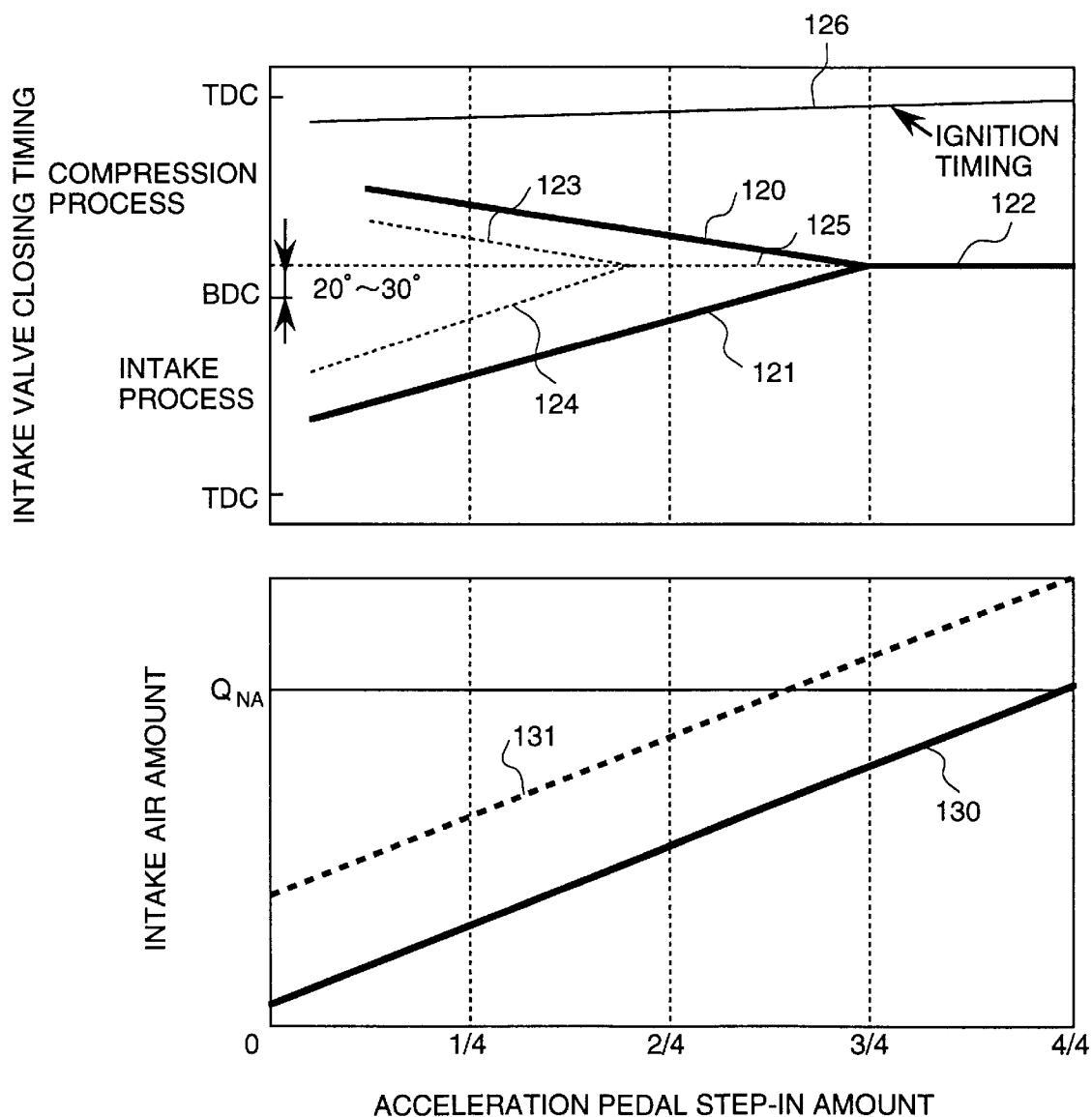
FIG. 10 is a plot showing the relationship among a step-in amount of an acceleration pedal, a valve closing timing of the intake valve and an intake amount according to the present invention.

FIG. 10 shows the relationship between the step-in amount of the acceleration pedal 61 and the valve closing timing of the intake valve 10 and indicates simultaneously the change in the intake amount at such time. In FIG. 10, reference numeral QNA indicates the maximum intake amount during the normal aspiration. Until the step-in amount of the acceleration pedal 61 is ¾, in the case of the earlier closing system the valve closing is determined by the solid line 121, and in the case of the later closing system the valve closing is determined by the solid line 120.

On and after the step-in amount of the acceleration pedal 61 is more than ¾, as stated above, it is controlled to the timing shown by reference numeral 122 where the air is taken in at the maximum. By expressing with the solid line, the air-fuel ratio is a case of a stoichiometric mixture ratio and by increasing the air-fuel ratio, the lean burn operation is carried out and in this case against the same torque, namely against the step-in amount of the acceleration pedal 61, since it is necessary to increase the intake amount as shown by the dotted line 131, the valve closing timing of the intake valve 10 becomes a dotted line 123 or a dotted line 124, and a dotted line 125.

Figure 11:
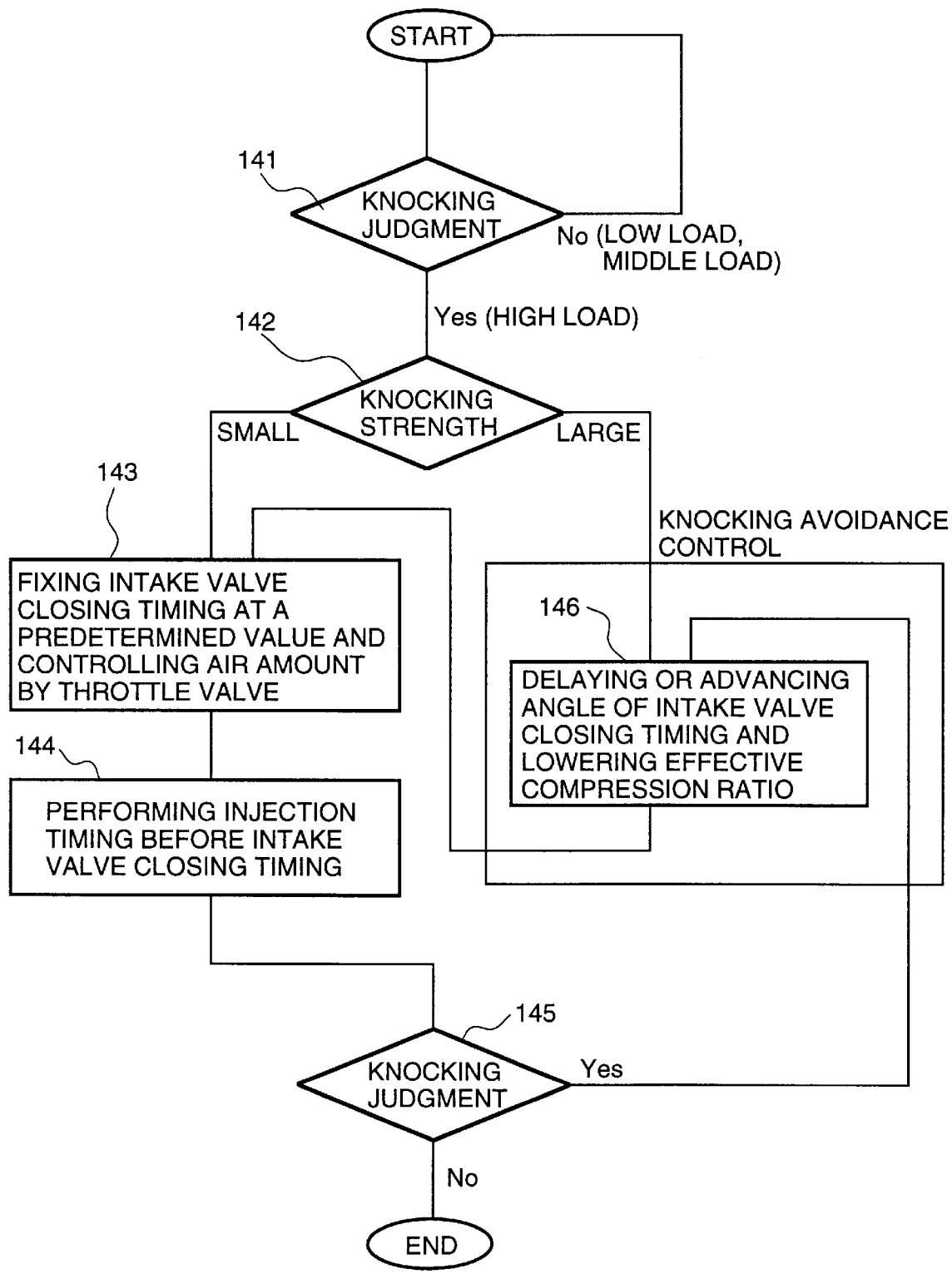
FIG. 11 is a flow chart showing an operation condition judgment method according to a knocking generation.

In another judgment method, the judgment is carried out in accordance with the existence of the knocking phenomenon as explained referring to the flow chart shown in FIG. 11. The knocking sensor 22 mounted on the engine 1 always detects the knocking phenomenon. In a block 141, the existence of the knocking phenomenon is judged, and in a case where the knocking phenomenon does not occur, it judges that as the low load condition and the middle load condition, whereby a process in a knocking phenomenon judgment block 141 starts.

In a case where the knocking phenomenon is judged to occur, it judges as the high load condition, and in a block 142 the strength of the knocking is judged initially. Since the knocking phenomenon causes destruction of the engine 1, it must be avoided to the utmost. However, in a case where the knocking strength is small, the operation mode during the high load condition is set, namely in a block 143 the valve closing timing of the intake valve 10 is set at a vicinity of 20–30 degrees after BDC, and the air amount is controlled by the throttle valve 17. And in a block 144, the fuel injection timing is set before the valve closing timing of the intake valve 10.

With the above stated construction, the air and the fuel are mixed fully in the combustion chamber 3 and the homogenous mixture is formed. Then according to the evaporation of the latent heat of the fuel 20 the temperature in the combustion chamber 3 is lowered, and the generation of the knocking phenomenon can be prevented.

In a block 145, the existence of the knocking phenomenon is judged, or when the knocking phenomenon is not generated, this process finishes. In the block 145 when the knocking occurs and in the block 142 when the knocking strength is large, the knocking avoidance control is carried out. Since it is considered that the knocking generated under this condition occurs because the combustion pressure in the combustion chamber 3 becomes too large, by advancing the angle or delaying the angle of the valve closing timing of the intake valve 10, and further by lowering an effective compression ratio, the knocking phenomenon can be restrained.

In a block 146, because the valve closing timing of the intake valve 10 for not generating the knocking phenomenon is determined, in the block 143, the valve closing timing of the intake valve 10 is altered from the above stated set value in the vicinity of 20–30 degrees after BDC to a value which is determined in a block 144, and then the intake amount is controlled by the throttle valve 17.

Further, in the block 144, the fuel injection timing is set before the valve closing timing of the intake valve 10. With the above stated construction, by the existence of the knocking phenomenon the operation condition of the engine 1 is judged, and when the knocking is generated at the high load operation mode, the knocking avoidance control is carried out.

Figure 12:
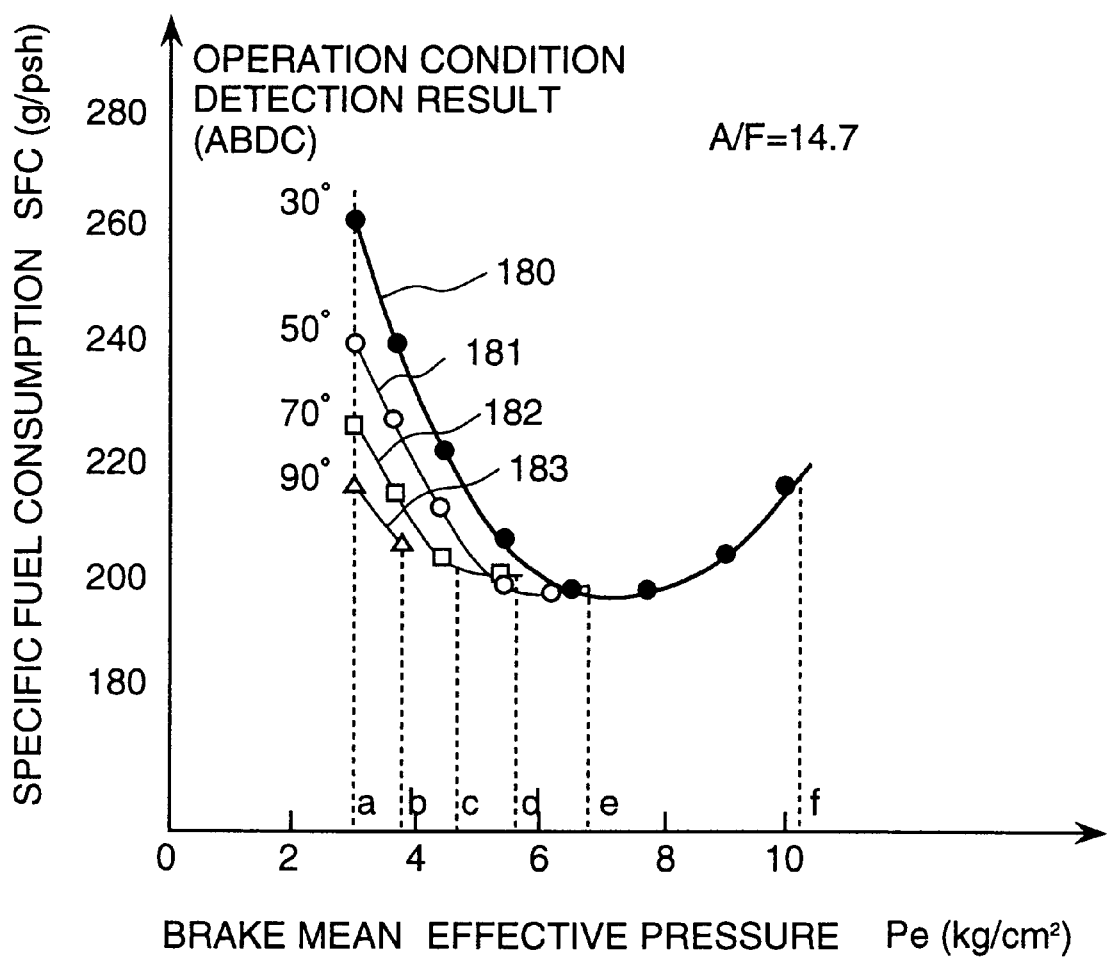
FIG. 12 is a plot showing the relationship of a brake mean effective pressure and a specific fuel consumption where the valve closing timing of the intake valve is varied.

FIG. 12 shows an engine test result in a case where under a constant air-fuel ratio the valve closing timing of the intake valve 10 is varied. In FIG. 12, a reference numeral (ABDC) in the vertical axis indicates 30 degrees after BDC of the intake process. The engine is a 1.8 litter engine having four cycles and four cylinders, and this engine 1 has the direct injection system where the fuel is injected directly to the combustion chamber 3.

The vertical axis also indicates the fuel consumption percentage and the horizontal axis shows where, as shown in a following formula (1), a brake shaft torque T (kgfm) outputted from a crank angle of the engine 1 is divided by a displacement vs (L), and it is converted to a brake mean effective pressure Pe (kg/cm²).

$$Pe = 1.257 * T/Vs \quad (1)$$

When the valve closing timing of the intake valve 10 is 30°, the specific fuel consumption SFC (g/psh) against to Pe varies as shown in the solid line 180. The air-fuel ratio at this time is 14.7.

In an automobile engine, as to the brake mean effective pressure Pe where the operation range of the low load and the middle load is wide from a portion of a to a vicinity of a portion of e, reducing the specific fuel consumption, it is effective to improve (1) the fuel consumption (kg/L) and (2) the fuel economy (km/L) of the vehicle.

By altering the valve closing timing of the intake valve 10, for example, in case of 50°, the specific fuel consumption (SFC) becomes o mark at the vicinity from the portion of a to a portion of d of Pe, and it will be understood that the (1) the fuel consumption (kg/L) and (2) the fuel economy (km/L) are both improved. At this time, the air-fuel ratio is 14.7.

Similarly, while maintaining the air-fuel ratio constant, when the valve closing timing of the intake valve 10 is increased, the fuel consumption is improved. This is because the opening degree of the throttle valve 17 increases and the pumping loss is reduced, and further the expansion process is longer than the compression process to improve the thermal efficiency.

However, when the valve closing timing of the intake valve 10 becomes too large, the compression process is shortened, namely since the compression pressure becomes low, it is not preferable to cause an unstable combustion and incomplete combustion.

As to the maximum output, when the valve closing timing of the intake valve 10 is 30°, Pe presents f; however, when the valve closing timing of the intake valve 10 is 50°, because of the flow back of the air amount, Pe is a portion of e. When the valve closing timing of the intake valve 10 increases further to 70° and 90°, because of the above stated reasons as to the maximum output, Pe is represented by the portion of d and the portion of b, respectively.

Figure 13:
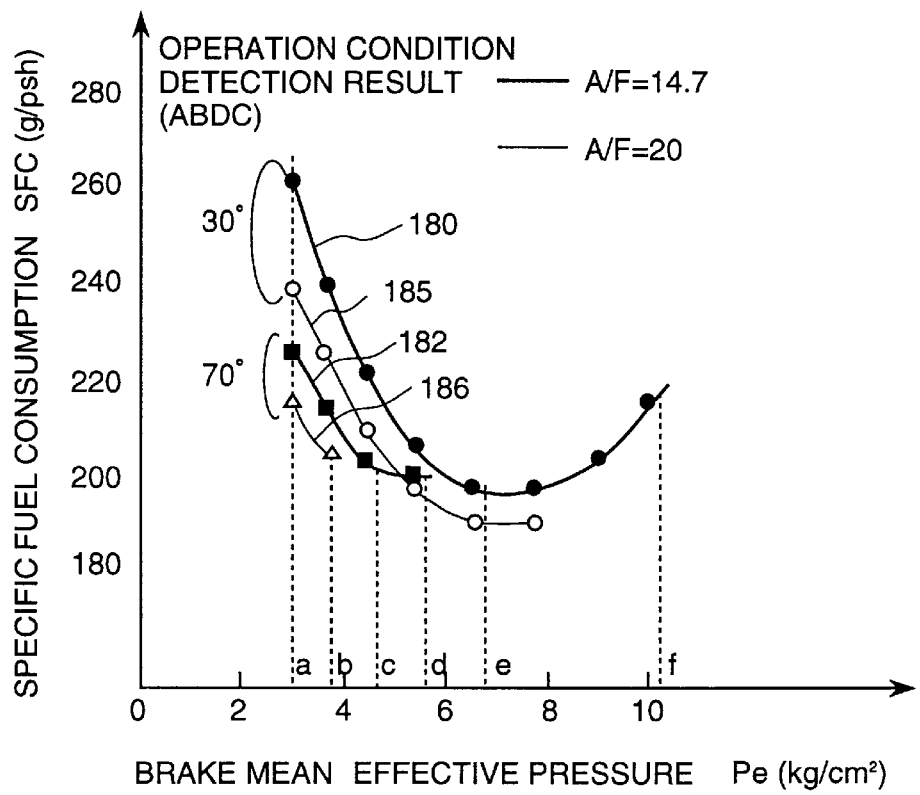
FIG. 13 is a plot showing the relationship of a brake mean effective pressure and a specific fuel consumption where the valve closing timing of the intake valve and an air-fuel ratio are varied, respectively.

FIG. 13 shows the engine test results in a case where the air-fuel ratio and the valve closing timing of the intake valve 10 are varied. When the valve closing timings of the intake valve 10 are 30° and 70°, the air-fuel ratios are respectively 14.7 and 20.

The solid line 180 in FIG. 13 indicates that when the valve closing timings of the intake valve 10 is 30°, the air-fuel ratio is 14.7, and when it operates with the lean burn having the air-fuel ratio of 20, the specific fuel consumption (SFC) is improved throughout the operation range as shown in the solid line 185. This is because the opening degree of the throttle valve 17 becomes larger than that of A/F=14.7 (the solid line 180), and then the pumping loss is reduced.

On the other hand, when the valve closing timings of the intake valve 10 is 70°, against the solid line 182 having the air-fuel ratio 14.7, when it operates the lean burn operation having the air-fuel ratio of 20, it becomes the solid line 188, and it is possible to operate the lean burn operation, with the result that a similar fuel consumption reduction effect can be expected.

Figure 14:
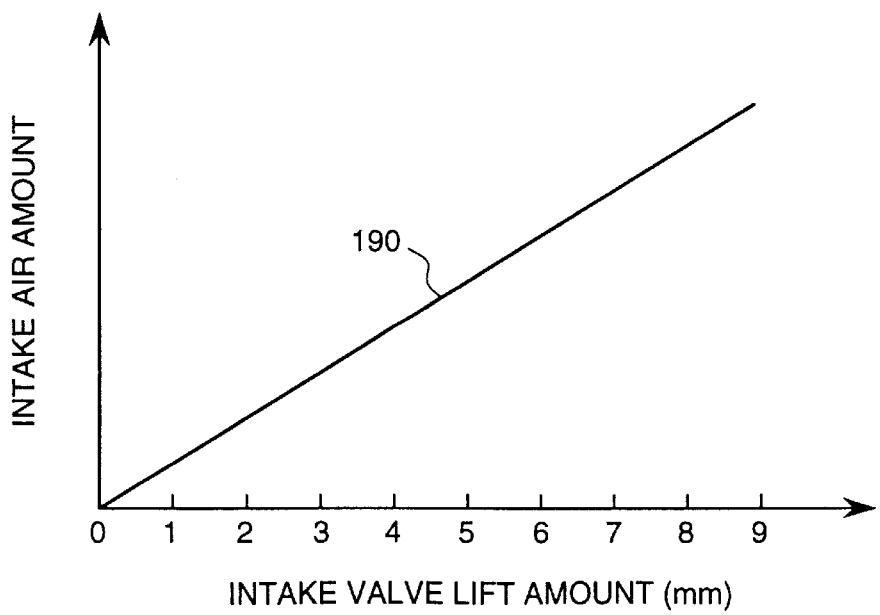
FIG. 14 is a plot showing the relationship between a valve closing timing of the intake valve and an intake amount.

FIG. 14 shows the relationship between the valve lift amount of the intake valve and the intake amount. By controlling the valve lift amount of the intake valve 10, the intake amount varies as shown in the solid line 190. In this case, the effect of the intake amount control by the valve closing timing of the intake valve 10 can be expected. Herein, the closing timing of the intake valve 10 is controlled to be constant.

When the valve lift amount of the intake valve 10 increases, because an inflow area of the air increases in proportion thereto, also the intake amount increases as shown in the solid line 190. Accordingly, in a condition where the operation condition of the engine 1 is judged as the low load and the middle load, even the throttle valve 17 presents a fully opened condition, and the intake amount can be controlled.

When the intake amount is small, since the valve lift amount is also small, the air velocity passing through the intake valve 10 becomes large, and the air motion necessary for the lean burn etc. can be generated in the combustion chamber 3. At a condition where the operation condition of the engine 1 is judged as the high load, the valve lift amount is increased to the maximum valve lift amount, and then the air can enter easily to the combustion chamber 3. In this manner, the maximum output can be assured.

In the control method of the internal combustion engine according to the present invention, because the variable valve mechanism and the throttle valve are used together, the intake amount can be controlled. And the combustion during the extremely low load condition such as the idling can be stabilized, and also during the low load condition and the middle load condition the pumping loss can be reduced. Further, during the high load condition, a large output can be secured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling an internal combustion engine having
    a valve mechanism including an intake valve and an exhaust valve associated, respectively, with an intake port and an exhaust port of a cylinder of the internal combustion engine;
    a valve mechanism controller configured to control said valve mechanism;
    an operation condition detector for an operation condition detection of the internal combustion engine; and
    a throttle valve for controlling an intake amount in response to an operation amount of an acceleration pedal;
    comprising the steps of;
    controlling said throttle valve to a high opening degree condition independently of said operation amount of said acceleration pedal when said operation condition detector judges as a low load or a middle load of the operation condition of the internal combustion engine; and
    controlling the intake amount by controlling at least one of a valve closing timing and a valve lift amount of said intake valve.

2. A method of controlling an internal combustion engine according to claim 1, wherein
    said intake valve is closed before a piston of the internal combustion engine is passed through a bottom dead center during an intake process.

3. A method of controlling an internal combustion engine according to claim 1, wherein
    said intake valve is closed after a piston of the internal combustion engine is passed through a bottom dead center during an intake process.

4. A method of controlling an internal combustion engine according to claim 1, wherein
    said operation detection means judges the operation condition of the internal combustion engine using a combustion chamber pressure detection means installed in a combustion chamber;
    when said combustion chamber pressure is less than an atmospheric pressure, it judges as a low load and a middle load; and
    when said combustion chamber pressure is more than the atmospheric pressure, it judges as a high load.

5. A method of controlling an internal combustion engine according to claim 1, wherein
    the operation condition of the internal combustion engine is judged using an operation amount of an acceleration pedal detector;
    when said operation amount of said acceleration pedal is less than ¾ of the maximum operation amount of said acceleration pedal, a low load and a middle load is judged; and
    when said operation amount of said acceleration pedal is more than ¾ of the maximum operation amount of said acceleration pedal, a high load is Judged.

6. A method of controlling an internal combustion engine according to claim 1, wherein
    the operation condition of the internal combustion engine is judged using a knocking detector; and
    when knocking is generated in the internal combustion engine, a high load is judged.

7. A method of controlling an internal combustion engine according to claim 1, wherein
    the operation condition of the internal combustion engine is judged using a knocking detector such that;
    when knocking is generated in the internal combustion engine, a high load is judged; and
    knocking avoidance is carried out by adjusting a valve closing timing of said intake valve using said valve mechanism.

8. A method of controlling an internal combustion engine according to claim 1, wherein
    a lean burn operation is carried out.

9. A method of controlling an internal combustion engine according to claim 1, wherein
    a supercharging operation is effected at an appropriate period of engine operation.

10. A method of controlling an internal combustion engine having
    a valve mechanism including an intake valve and an exhaust valve operatively associated with each cylinder of the internal combustion engine;
    a valve mechanism controller configured to control said valve mechanism;
    an operation condition detector for an operation condition detection of the internal combustion engine; and
    a throttle valve for controlling an intake amount in response to an operation amount of an acceleration pedal;
    comprising the steps of;
    controlling an opening degree of said throttle valve in response to said operation amount of said acceleration pedal when said operation condition detector judges a high load as the operation condition; and controlling each said intake valve to open each said intake valve by a predetermined timing after a bottom dead center during an intake process of a piston of the internal combustion engine in accordance with a control signal from said valve mechanism controller.

11. A method of controlling an internal combustion engine having a valve mechanism including an intake valve and an exhaust valve operatively associated with a cylinder of the internal combustion engine;

a valve mechanism controller configured to control said valve mechanism;

an operation condition detector for an operation condition detection of the internal combustion engine; and a throttle valve for controlling an intake amount in response to an operation amount of an acceleration pedal;

comprising the steps of controlling said throttle valve to a high opening degree condition regardless of said operation amount of said acceleration pedal when said operation detector judges a low or middle load as the operative condition of the internal combustion engine;

with respect to at least one of a valve closing timing and a valve lift amount of said intake valve; and injecting directly fuel into said respective cylinder after closing said intake valve.

12. A method of controlling an internal combustion engine having a valve mechanism including an intake valve and an exhaust valve operatively associated with a cylinder of the internal combustion engine;

a valve mechanism controller configured to control said valve mechanism;

an operation condition detector for an operation condition detection of the internal combustion engine; and a throttle valve for controlling an intake amount in response to an operation amount of an acceleration pedal;

comprising the steps of controlling an opening degree of said throttle valve in response to said operation amount of said acceleration pedal when a high load of the operation condition of the internal combustion engine is judged;

controlling said intake valve to open said intake valve by a predetermined timing after a bottom dead center during an intake process of a piston of the internal combustion engine in accordance with a control signal from said valve mechanism controller; and injecting directly fuel into said respective cylinder before closing said intake valve.

13. In an internal combustion engine wherein a throttle valve is held at a predetermined high opening degree condition regardless of an operation amount of an acceleration pedal during a predetermined low load operation condition and a predetermined middle load operation condition of the internal combustion engine;

an electromagnetic driving intake valve for controlling at least one of a valve closing timing and a valve lift amount in response to an operation condition of the internal combustion engine.

14. A control apparatus of an internal combustion engine, comprising an intake valve for opening and closing an intake port of a cylinder;

an electromagnetic drive mechanism for driving electromagnetically said intake valve;

a throttle valve for controlling an intake amount in response to an operation amount of an acceleration pedal;

an electromagneto-actuator for electromagnetically driving said throttle valve; and an electronic control circuit for supplying a signal to said electromagnetic driving mechanism and said electromagneto-actuator in response to an operation condition of the internal combustion engine; such that during a low load operation condition and a middle load operation condition of the internal combustion engine, said electronic control circuit supplies a control signal for holding a predetermined high opening degree to said throttle valve, and further said electronic control supplies a control signal for controlling at least one of a valve closing timing and a valve lift amount of said intake valve to said electromagnetic driving mechanism in response to an operation condition of the internal combustion engine.

15. A control apparatus of an internal combustion engine, comprising an intake valve for opening and closing an intake port of each cylinder;

an electromagnetic drive mechanism for driving electromagnetically said intake valve; and an electronic control circuit for supplying a signal to said electromagnetic driving mechanism in response to an operation condition of the internal combustion engine;

such that at an operation area of a low load and a middle load of the internal combustion engine, said control circuit supplies a control signal for controlling at least one of a valve closing timing and a valve lift amount of said intake valve to said electromagnetic driving mechanism in response to an operation amount of an acceleration pedal.

* * * * *